United States Patent

[11] 3,617,768

[72] Inventor Sigurd Günther Waaben
Princeton, N.J.
[21] Appl. No. 69,227
[22] Filed Sept. 3, 1970
[45] Patented Nov. 2, 1971
[73] Assignee Bell Telephone Laboratories, Incorporated
Murray Hill, N.J.

[54] CHARGE TRANSFER DIODE SHIFT REGISTER
13 Claims, 4 Drawing Figs.

[52] U.S. Cl. .......... 307/221, 307/281, 307/317
[51] Int. Cl. .......... G11c 19/00
[50] Field of Search .......... 307/221, 281, 317; 328/37

[56] References Cited

UNITED STATES PATENTS

| | | | |
|---|---|---|---|
| 3,162,776 | 12/1964 | Gerlach et al. | 307/221 |
| 3,253,162 | 5/1966 | Barnes et al. | 307/221 X |
| 3,258,614 | 6/1966 | Burlak | 307/221 |
| 3,450,967 | 6/1969 | Tolutis | 307/221 X |

*Primary Examiner*—John S. Heyman
*Attorneys*—R. J. Guenther and Arthur J. Torsiglieri ABSTRACT: This application describes a shift register which employs a plurality of diode storage stages. Each of the diode stages includes: a first reverse-biased diode which is used as a capacitance for information storage; a second diode, of the charge-storage type, which is used for temporary information storage and for information transfer; and third and fourth diodes, of the Schottky barrier type, which are used for stage isolation and for directionality. Information, in the form of stored charge, is transferred from a first stage of the register to the next adjacent stage by applying a forward bias to the charge-storage diode of the former. Application of the bias enables the charge stored in the capacitance of the first diode of the first stage to flow through the third diode of that stage and into the charge-storage diode, where it is temporarily stored. Reversal of the bias causes the stored charge to be discharged from the charge-storage diode, and to flow through the fourth diode into the capacitance of the first diode of the next adjacent stage, where it is again stored.

INVENTOR
S. G. WAABEN
BY
Lipman Sherman
ATTORNEY

CHARGE TRANSFER DIODE SHIFT REGISTER

BACKGROUND OF THE INVENTION

This invention relates to dynamic electronic shift registers and more particularly to dynamic shift registers employing a combination of capacitance-diode storage and minority-carrier-diode storage.

As is well known, shift registers have found widespread application in present day digital information processing systems. Typically, such shift registers comprise a plurality of storage stages. The information stored in each stage is transferred, via an intermediate storage mechanism, to the next successive stage by application of shifting signals. Thus, information can be moved through the register from its input port to its output port by successive applications of the shifting signals.

Since many digital processing systems require large numbers of shift registers, it is important that they be inexpensive and of limited size. To achieve these ends, shift registers have been proposed whose storage stages are composed solely of diodes. Such registers can be inexpensively implemented in integrated form.

In some shift registers of this type, each stage includes a charge-storage diode for storage of its information. The charge-storage diode stores the information as a minority-carrier charge in its lattice structure or bulk. As a result, the maximum amount of time that the information can be stored is limited to the minority-carrier lifetime of the charge-storage diode, i.e., the time it takes the minority carriers, in the absence of a bias, to become depleted by recombination with one another in the diode junction. Moreover, once the charge-storage diode shift register is fully loaded, that is, once each stage has information stored, the register cannot hold the information for a time exceeding the minority-carrier lifetime. Hence, such shift registers are limited to relatively short holding times.

It also should be noted that prior art charge-storage diode shift registers typically require two shifting signals to shift information through the register. In addition, the shifting signals have to be properly synchronized to assure operation of the register. Such synchronization typically involves circuitry which adds to the complexity of the register function.

It is therefore a broad object of the present invention to provide a charge-storage diode shift register whose storage stages have storage times which exceed the minority-carrier lifetimes of the charge-storage diodes employed.

It is another object of the present invention to provide a charge-storage diode shift register which employs a single shifting signal.

SUMMARY OF THE INVENTION

In accordance with the principles of the present invention, the above objects are accomplished by employing a diode-shift register which comprises a plurality of stages, each of which includes a charge-storage diode to effect information transfer, and a reverse-biased diode, acting as a capacitor, to effect information storage. More particularly, each stage comprises four diodes. Information is stored in each stage in first reverse-biased diode which is connected to the input port of the stage. A second diode couples the latter diode to a third charge-storage diode which, in turn, is coupled to the output port of the stage through a fourth diode. Transfer of the stored information to the output port of the stage is initiated by forward-biasing the charge-storage diode. The change in bias causes the information charge to be coupled through the second diode into the charge-storage diode where it is temporarily stored. Returning the charge-storage diode to a reverse bias condition causes the information to be expelled from the latter diode, wherein it is directed by the fourth diode to the output port of the stage.

BRIEF DESCRIPTION OF THE DRAWINGS

A clearer understanding of the above-mentioned features of the present invention can be obtained by reference to the following detailed description taken in conjunction with the accompanying drawings, in which.

DETAILED DESCRIPTION

Figures 1, 2:
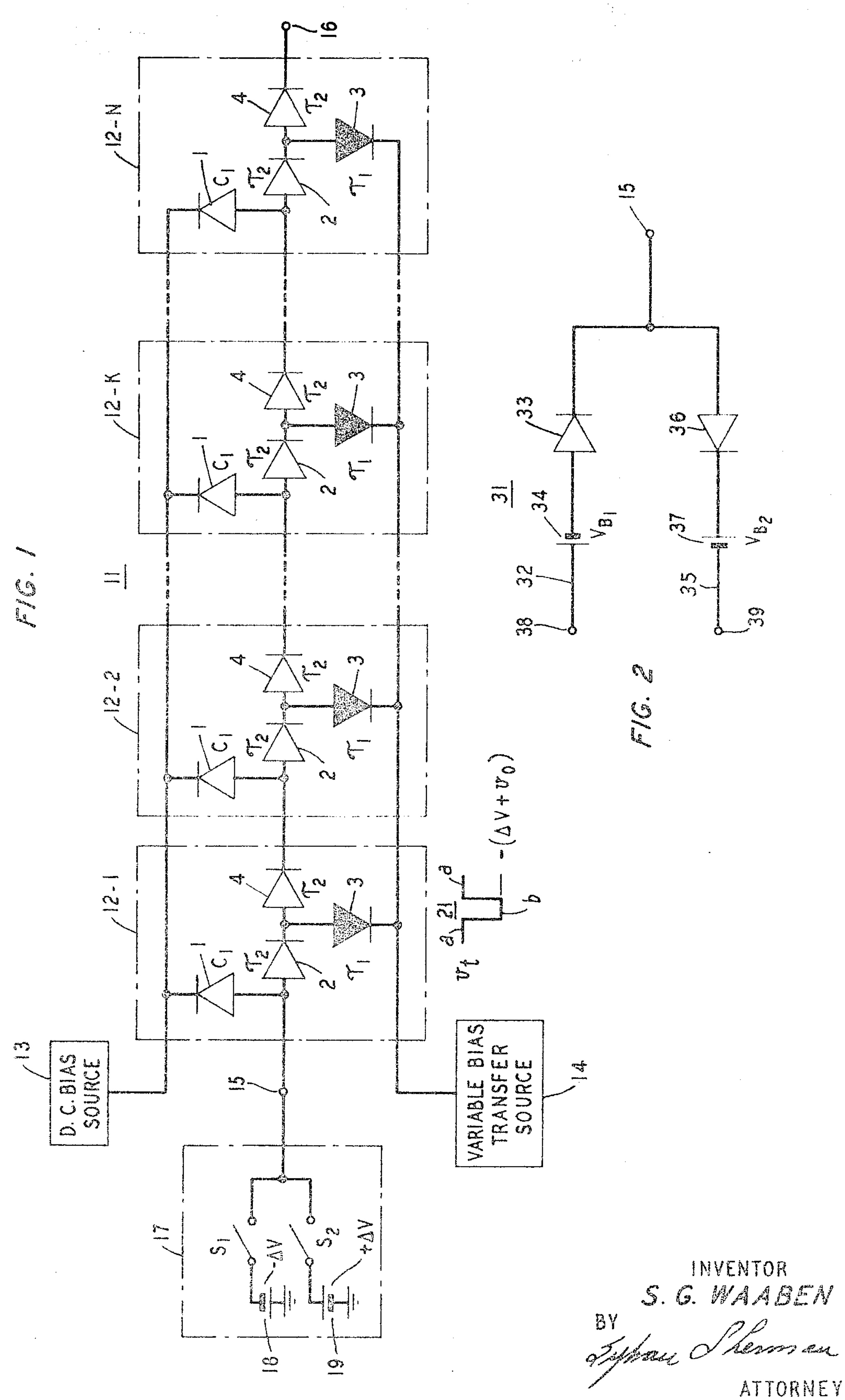
FIG. 1 is a shift register in accordance with the principles of the instant invention.
FIG. 2 shows a drive circuit for feeding information into the shift register of FIG. 1.

In FIG. 1, shift register 11 comprises a plurality of N-cascaded stages 12–1 to 12–N. Each of the stages 12 shares a common DC bias source 13 and a common variable bias transfer source 14, and includes a similar array of four diodes 1, 2, 3 and 4. The diodes of each of the stages are connected in the following manner. Diodes 2 and 4 are connected in series-aiding relationship. The anode of diode 2 is coupled to the anode of diode 1. The cathode of diode 1 is coupled to DC source 13. The anode and cathode of diode 3 are coupled, respectively, to the common connection between diodes 2 and 4 and to bias source 14.

Interconnection of the stages 12 is effected by coupling the common connection between diodes 1 and 2 (i.e., the input port) of each stage to the cathode of diode 4 (i.e., the output port) of the preceding stage in the cascade. Information is introduced into shift register 11 via input port 15, which is coupled to anodes of diodes 1 and 2 of stage 12–1, and is extracted from the register via output port 16, which is coupled to the cathode of diode 4 of stage 12–N. Ordinarily, the circuit would be integrated into a single semiconductive wafer.

Diode 1 can be any type of diode which acts effectively as a capacitive element when reverse-biased. Typically, an ordinary PN junction diode can be so employed. Diode 2 is selected to have a minority-carrier lifetime $\tau_2$ which is advantageously as short as possible. Diode 3, on the other hand is selected to have a minority-carrier lifetime $\tau_1$ which is substantially larger than $\tau_2$. Moreover, in order to simplify the discussion, diode 4 is assumed to be identical to diode 2 and thus to also have a short minority-carrier lifetime $\tau_2$. It is noted, however, that in practice, diode 4 need not be the same as diode 2, but, advantageously, should be selected to have a minority-carrier lifetime which is at least an order of magnitude less than $\tau_1$. The foregoing requirements on diodes 2, 3 and 4 can be readily met by selecting diodes 2 and 4 as high-barrier Schottky diodes, and diode 3 as a charge-storage diode.

A high-barrier Schottky diode is a metal semiconductor diode that stores essentially no minority carriers during forward conduction and rapidly changes from a short circuit to an open circuit in response to a reversal of the bias applied thereto. Since the Schottky diode stores essentially no minority carriers, its minority-carrier lifetime is substantially zero. A more detailed description of such a Schottky diode is presented by S. M. Sze in Physics of Semiconductor Devices, chap. 8, John Wiley and Sons, 1969.

A charge-storage diode is a PN junction diode which is designed to store minority carriers during forward conduction and to require a relatively long time to discharge the stored minority carriers in the absence of a reverse drive applied thereto. The minority-carrier lifetime of the charge-storage diode is substantially greater than the carrier lifetime of the Schottky diode. A more detailed description of charge storage in PN junction diodes is given by J. L. Moll, S. Krakauer, and R. Shen in their article entitled, "P-N Junction Charge-Storage Diodes," Proceedings of the IRE, Jan. 1962, page 43.

The direct current supplied by bias source 13 is maintained at a positive potential which is, at all times, higher than the variable bias supplied by source 14. Source 13, therefore, holds each of the diodes 1 in a reverse-biased mode during operation of register 11. When functioning in such a mode, each of the diodes 1 appears as a capacitive element. Since, in the instant embodiment, all of the diodes 1 are selected to be the same, each has the same capacitance $C_1$, as indicated.

In quiescent state, that is, prior to information being applied to register 11, bias source 14 is also at a positive potential. Since source 13 is at a higher potential than the latter source, a small amount of leakage current flows from each of the diodes 1 through its associated diodes 2 and 3. The latter two diodes of each stage, therefore, conduct very slightly in the forward direction and, as a result, there is a small potential drop across each. Moreover, since each of the stages has a similar array of diodes, the potential drop across each of the diodes 2 is substantially the same. This being the case, the cathodes of diodes 4 are at a slightly higher potential than their anodes. Thus, each of these diodes is reverse-biased and, as a result, substantially nonconducting.

In operation, information is fed into register 11 by clamping input port 15, and, therefore, the anode of diode 1 to either of two voltage levels. Each voltage level corresponds to one of the two binary states.

In FIG. 1, a drive source 17 for clamping port 15 is schematically illustrated as a series combination of a first battery 18 and a first switch $S_1$ connected in parallel with a series combination of a second battery 19 and a second switch $S_2$. Switches $S_1$ and $S_2$ can be alternately closed, thereby clamping the anode of diode 1 to either a small negative voltage $-\Delta v$, which voltage corresponds to a first binary state designated as a space, or a small positive voltage $+\Delta v$, which voltage corresponds to a second binary state designated as a mark. Any number of electronic circuits can be employed to perform the function of source 17. A particular circuit is shown in FIG. 2 and will be described hereinbelow.

To illustrate how information is fed into register 11, let it be assumed, for example, that a mark is to be coupled into the register. This is accomplished, as mentioned above, by closing switch $S_2$, which results in clamping the anode of diode 1 to voltage $+\Delta v$. The latter voltage at the anode of diode 1 reverse-biases both diode 2 and diode 3. Moreover, it causes current to flow into diode 1 and charge to be stored therein. Switch $S_2$ remains closed until the charge stored in diode 1 is sufficient to maintain the anode of the diode at $+\Delta v$. As a result, when switch $S_2$ is opened, the anode of diode 1 remains at that voltage, and diodes 2 and 3 remain nonconducting.

Feeding a space into register 11 is effected in a manner similar to that described for a mark. That is, switch $S_1$ is closed, thereby causing diodes 2 and 3 to be reverse-biased and, at the same time, charge to be stored in diode 1. Switch $S_1$ remains closed until diode 1 stores charge sufficient to maintain the voltage of its anode at $-\Delta v$. Hence, when switch $S_1$ is opened, the anode of diode 1 remains at $-\Delta v$, and diodes 2 and 3 remain nonconducting.

Once information in the form of a mark or space is stored in stage 12–1 by the aforesaid clamping of the anode of diode 1 of the latter stage, it is transferred to the next successive stage (i.e., stage 12–2) in the register by varying the bias provided by source 14. The aforesaid variation in the bias supplied by source 14 is illustrated in FIG. 1 by waveform 21.

As shown, the bias is varied from its initial positive voltage $v_t$, indicated by level *a* of waveform 21, to voltage $-(\Delta v+v_0)$, where $v_0$ corresponds to the forward bias necessary to place diodes 2 and 3 at the brink of substantial forward conduction. This is indicated by the level *b* of the waveform. The resulting effect upon diodes 2 and 3 of stage 12–1 depends upon whether a mark or space is stored in the stage. If a space is stored in a stage, then the anode of diode 1 is at a voltage $-\Delta v$. As a result, there is insufficient voltage impressed across diodes 2 and 3 and they remain essentially cut off. Thus, in the case of a space, no current flows and no charge enters charge-storage diode 3.

If, on the other hand, a mark is present in stage 12–1, then the anode of diode 1 is at a voltage of $+\Delta v$. Thus, when the bias supplied by source 14 reaches voltage $-(\Delta v+v_0)$, the series diodes 2 and 3 become forward-biased and conduct, thereby providing a discharge path for the charge stored on diode 1. The latter charge passes from diode 1 through diode 2 and into charge-storage diode 3, where it is temporarily stored as minority carriers. Diode 1 continues to discharge until its anode reaches voltage $-\Delta v$. At this time diodes 2 and 3 are no longer sufficiently forward-biased for conduction to continue and, as a result, cease conducting. Thus, the charge transferred from diode 1 and temporarily stored in diode 3 corresponds to a voltage change of $2\Delta v$.

It is noted, therefore, that at this point in the transfer operation, the anode of diode 1 is at a voltage $-\Delta v$ regardless of whether a mark or space is initially stored in stage 12–1. However, in the case of an initially stored mark, charge-storage diode 3 now stores a quantity of charge corresponding to a voltage change of $2\Delta v$, while in the case of an initially stored space, no charge is stored in charge-storage diode 3. It is further noted that since source 14 is similarly connected to each of the stages 12, the above variation of the bias it provides has the same effect on all the stages. Thus, due to the change in the bias provided by source 14, the anode of diode 1 of each of the stages will similarly be at a voltage of $-\Delta v$.

Completion of the transfer operation is effected by returning the bias supplied by source 14 to its initial positive voltage $v_t$. In the case of an initially stored mark, the latter change in the bias supplied by source 14 causes diode 3 to conduct in the reverse direction, due to the minority-carrier charge previously stored. Since diode 3 now presents a low-impedance path in the reverse direction, the bias supplied by source 14 is effectively coupled to the anode of diode 4, thereby forward-biasing the latter diode. The charge stored on diode 3, therefore, is expelled and is transferred out of stage 12–1 to diode 1 of stage 12–2, via the conduction path afforded by diode 4. Once all the stored charge is expelled from diode 3, it returns to a reverse-bias condition, and it and diode 4 cease to conduct. Since the charge added to diode 1 of the next succeeding stage 12–2 corresponds to a voltage change of $2\Delta v$, this raises the anode voltage of diode 1 of stage 12–2 to $+\Delta v$. Thus, the transfer operation has resulted in the mark being transferred from stage 12–1 to stage 12–2.

If a space had been initially stored in stage 12–1, returning the bias provided by source 14 to its original positive potential does not cause charge-storage diode 3 to conduct in the reverse direction, since, in this instance, diode 3 has no minority-carrier stored charge. As a result, no charge is added to diode 1 of stage 12–2 and the anode of the latter diode remains at a voltage of $-\Delta v$, which voltage corresponds to a stored space. Thus, in this case, the transfer operation has similarly resulted in transferring the information stored in stage 12–1 to stage 12–2.

Once transfer of the information stored in stage 12–1 is accomplished, the next incoming mark or space is fed into register 11 by again clamping input port 15 to the appropriate voltage, as explained hereinabove. Thereafter, additional information is stored by sequential transfer and feed operations.

FIG. 2 illustrates an electronic circuit 31 which can be employed to drive shift register 11. The circuit comprises a first branch 32, which includes a diode 33 and a constant voltage source 34, and a second branch 35, which also includes a diode 36 and a constant voltage source 37. The anode of diode 33 of branch 32 is coupled to the negative terminal of source 34. The positive terminal of the latter source is connected to input port 38 of branch 32. The cathode of diode 36 of branch 35 is coupled to the positive terminal of source 37. The negative terminal of source 37 is connected to input port 39 of branch 35. The two branches are coupled to input port 15 of register 11.

Branch 35 of circuit 31 is employed to present the voltage at port 15. Branch 32, on the other hand, is used to introduce information into the latter port. In the quiescent state, ports 38 and 39 are at substantially ground potential. Moreover, the voltages $V_{B_1}$ and $V_{B_2}$ provided by sources 34 and 37, respectively, hold diodes 33 and 36 in reverse-bias mode.

In operation, the potential at port 39 is reduced such that diode 36 becomes forward-baised and thereby causes the voltage at port 15 to be preset at $-\Delta v$. The potential at port 39 is then returned to its initial voltage. Information is introduced into register 11 by changing the potential at port 38. If a mark is to be introduced, the voltage at port 38 is increased such that diode 33 becomes forward-biased and thereby results in clamping the potential at port 15 to a voltage $+\Delta v$. If a space is to be introduced, the voltage at port 38 is kept at its initial level since the potential at port 15 is initially preset at $-\Delta v$ and, thereafter, is automatically clamped at $-\Delta v$ after each transfer of information out of stage 12–1.

It should be pointed out that the information transfer operation in shift register 11, that is, the transfer of information in the form of stored charge from diode 1 of each stage to diode 1 of the next successive stage, occurs almost instantaneously once the bias provided by source 14 is changed to the appropriate voltages. Thus, the time it takes for the transfer operation to occur is only limited by the time it takes to decrease and then increase the bias supplied by source 14. Typically, a conventional high-speed pulse generator, having a combined rise and fall time of the order of 4 nanoseconds can be employed as source 14. Thus, use of such a generator would enable operation of register 11 at speeds of the order of 200 mHz. It is noted, however, that the use of pulse generators with a combined rise and fall time smaller than 4 nanoseconds would enable realization of operating speeds far in excess of 200 mHz.

It should be also noted that in discussing the operation of register 11, it was implicitly assumed that degradation of a mark or space did not occur either while the charge corresponding to the information was being stored in a stage or transferred between stages. However, in actuality, some degradation of the information does occur. Such degradation is due to a loss of some of the charge corresponding to the information which, in turn, is a result of leakage of charge from the diodes 1 and recombination of charge in the diodes 3. Since both the aforesaid loss mechanisms are functions of time, the total loss of charge resulting from passage of the information through register 11 is a function of the total amount of time the charge is held in the register. Thus, in order to ensure that the information is not rendered unrecognizable by too severe a loss of its corresponding charge, register 11 should be continuously operated at information rates which are greater than a specified minimum rate. The latter rate can be determined once a level is set on the allowable loss of charge. If the information rate employed is substantially faster than the determined minimum rate, then the total loss of charge will be negligible. In such instances, the entire register can be filled and the information held for a predetermined amount of time which, typically, can be of the order of 1 millisecond.

Figure 3:
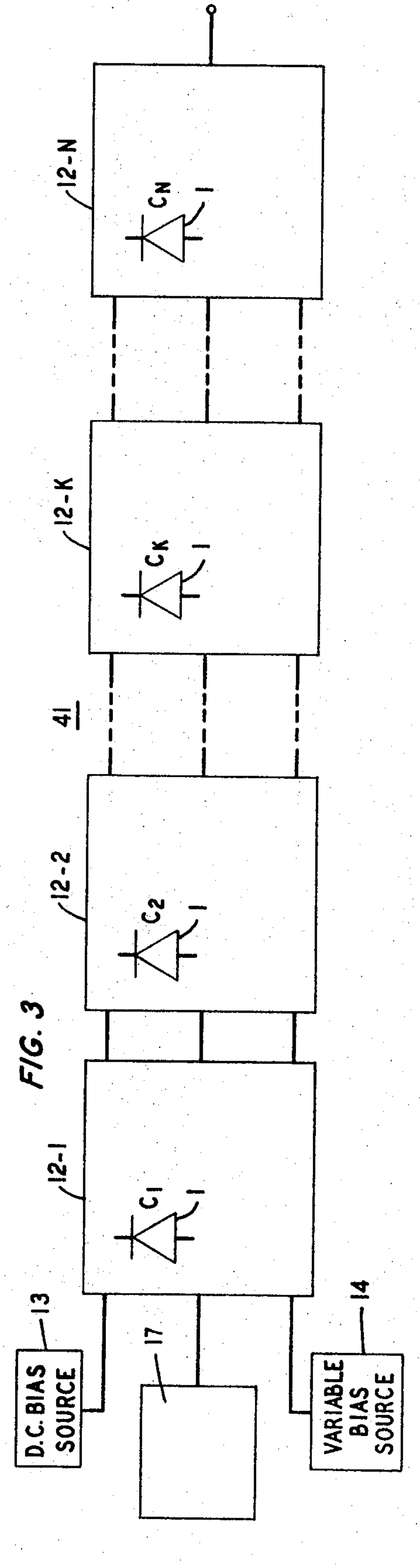
FIG. 3 shows a modification of the shift register of FIG. 1 in which charge compensation is employed.

As indicated above, some of the charge corresponding to the information applied to register 11 is lost in diodes 1 and 3 of each of the stages. For a given information rate, the aforesaid loss in charge places a limitation on the number of stages which can be satisfactorily employed in the register. In order to increase the number of stages realizable, for the same information rate, some form of charge compensation can be employed. FIG. 3 illustrates a modification of register 11 incorporating charge compensation.

In FIG. 3, a shift register 41 is substantially similar to shift register 11 of FIG. 1, except that each of the reverse-biased diodes 1 no longer has the same value of capacitance. In order to avoid repetition of the entire register, each stage is merely indicated by a block. Only the diodes 1 and their corresponding capacitances are specifically indicated.

As shown in FIG. 3, diodes 1 of stages 12–1 to 12–N have capacitances $C_1$ to $C_n$, respectively. The diodes 1 are selected such that each diode when reverse-biased has a smaller capacitance than the diode 1 of the next successive stage in the register (i.e., $C_1 > C_2 \ldots C_n$). Each successive stage, therefore, requires less charge to raise the anode voltage of diode 1 a predetermined amount. As a result, when charge, corresponding to a stored mark, for example, is transferred from diode 1 of a first stage in register 41 to diode 1 of the next successive stage, the loss in charge due to storage in and transfer out of the first stage, which tends to degrade the information, is compensated for by the smaller capacitance of the diode 1 of the second stage. That is, due to the smaller capacitance of the latter diode, the smaller amount of charge transferred to it is sufficient to effect the desired voltage change. Thus, even though loss of charge has occurred the information is transferred with substantially no degradation.

Figure 4:
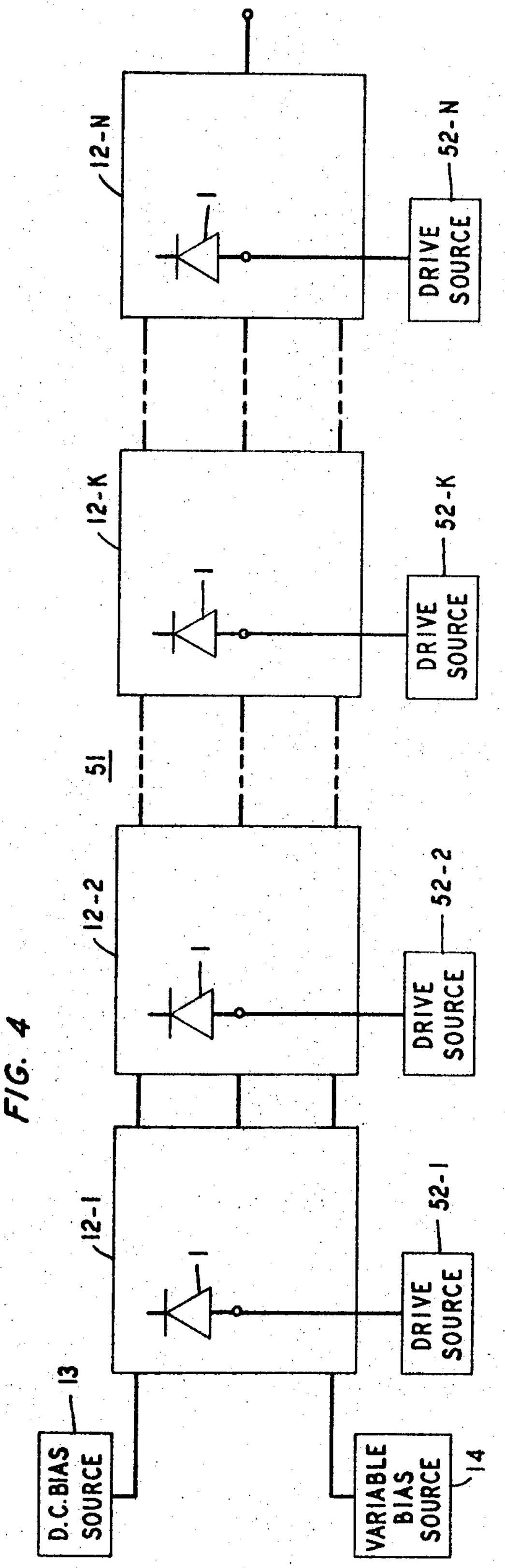
FIG. 4 is illustrative of a second modification of the shift register of FIG. 1 in which information is fed into the register by a plurality of drive sources.

In FIG. 4, a second modification of the embodiment of FIG. 1 is illustrated. This embodiment differs from the embodiment of FIG. 1 in that, instead of information being fed only into diode 1 of stage 12–1, each of the diodes 1 are simultaneously fed information by drive sources 52–1 to 52–N, respectively. Each of the drive sources can be exactly similar to drive source 17 of FIG. 2 and, hence, each is indicated by a block. Each of the stages 12 is also represented as a block, except for the connection of its diode 1 with its respective drive source.

Once the N stages of register 51 are fed either a mark or space by the simultaneous clamping of the anodes of the diodes 1, the information can be serially extracted through output port 16 by successive transfer operations. Thus, by employing the arrangement of FIG. 4, N parallel information paths can be converted into one series information path.

It is to be understood that the embodiments described herein are merely illustrative, and that numerous and varied other arrangements can readily be devised in accordance with the teachings of the present invention without departing from the spirit and scope of the invention. In particular, as an alternative method for compensating for lost charge, charge multipliers can be periodically inserted in the register for regeneration of charge. Each multiplier can comprise an emitter-follower circuit having a capacitor in its emitter leg. Each circuit would be coupled between diodes 1 and 2 of a stage, with the base of the emitter-follower connected to the anode of diode 1 of the stage and the emitter connected to the anode of diode 2 of the stage.

Another modification could be the use of capacitors, instead of reverse-biased diodes, as storage elements for the stages.

What is claimed is:

1. A shift register including:

a plurality of cascaded diode storage stages, each comprising:
- a first diode having a first minority-carrier lifetime;
- a second diode having a second minority-carrier lifetime;
- means for connecting the cathode of said first diode to the anode of said second diode;
- the anode of said first diode serving as the input port for said stage;
- the cathode of said second diode serving as the output port for said stage;
- a third diode having a third minority-carrier lifetime;
- means for connecting the anode of said third diode to the common junction of said first and second diodes;
- a fourth diode;
- and means for connecting one terminal of said fourth diode to the anode of said first diode;

a first common port;

means for connecting the other terminal of the fourth diode of each of said stages to said first common port;

a second common port;

means for connecting the cathode of the third diode of each of said stages to said second common port.

2. A shift register in accordance with claim 1 wherein said input port of said first stage serves as the input port of said register, and wherein the output port of said last stage serves as the output port of said register.

3. A shift register in accordance with claim 2 which includes, in addition, an information source connected to said input port of said register.

4. A shift register in accordance with claim 2 in which said third minority-carrier lifetime of said third diode of each of said stages is substantially larger than said first and second minority-carrier lifetimes of said first and second diodes of each of said stages.

5. A shift register in accordance with claim 2 which includes, in addition:

a first bias source connected to said first common port for supplying a voltage to said first common port;

a second bias source connected to said second common port for supplying a voltage to said second common port;

and means for varying the voltage supplied by said second bias source, thereby causing the information stored in each of said stages to be transferred to the next adjacent stage along said cascade.

6. A shift register in accordance with claim 5 in which the voltage supplied by said first bias source is sufficient, relative to the voltage supplied by said second bias source, to reverse-bias each of said fourth diodes.

7. A shift register in accordance with claim 6 in which the fourth diode of each of said stages, when reverse-biased, is equivalent to a capacitive element.

8. A shift register in accordance with claim 7 in which the information in each of said stages is stored in the fourth diode of each of said stages.

9. A shift register in accordance with claim 8 in which each of said fourth diodes has the same equivalent capacitance when reverse-biased.

10. A shift register in accordance with claim 9 in which each of said first and second diodes is a Schottky barrier diode and in which each of said third diodes is a charge-stored diode.

11. A shift register in accordance with claim 8 in which the fourth diode of each of said stages has an equivalent capacitance, when reverse-biased, which is greater than the equivalent capacitance of the fourth diode of the next successive stage in the cascade.

12. A shift register in accordance with claim 1 wherein the input ports of said stages serve as input ports of said register, and wherein the output port of said last stage serves as the output port of said register.

13. A shift register in accordance with claim 12 which includes, in addition: a plurality of information sources, each connected to the input port of a different one of said stages, thereby enabling information to be fed into said register through a plurality of paths and to be extracted from said register, by successive transfer operations, through a single path.

* * * * *